United States Patent [19]
Alberts

[11] Patent Number: 5,564,717
[45] Date of Patent: Oct. 15, 1996

[54] REMOVABLE ADAPTER FOR A POWER-DRIVEN SCREWDRIVER

[76] Inventor: Eric Alberts, 24 Grove St., Montvale, N.J. 07645

[21] Appl. No.: 504,174

[22] Filed: Jul. 19, 1995

[51] Int. Cl.⁶ .................................................. B23B 51/12
[52] U.S. Cl. .................. 279/145; 7/158; 7/165; 81/438; 408/239 A
[58] Field of Search .................. 279/143–145; 408/239 R, 239 A, 240; 7/158, 165; 81/121.1, 125, 437–439

[56] References Cited

U.S. PATENT DOCUMENTS

| | | | |
|---|---|---|---|
| 524,906 | 8/1894 | McDougall | 7/158 |
| 2,696,859 | 12/1954 | Somma | 81/437 |
| 3,973,784 | 8/1976 | Smith | 408/239 A |
| 5,097,555 | 3/1992 | Dwyer | 7/158 |
| 5,110,145 | 5/1992 | Stewart | 408/239 A |
| 5,170,545 | 12/1992 | Hubscher | 408/241 R |
| 5,224,230 | 7/1993 | Vanicsek et al. | 7/158 |
| 5,261,135 | 11/1993 | Mitchell | 7/158 |

*Primary Examiner*—Steven C. Bishop
*Attorney, Agent, or Firm*—Brumbaugh, Graves, Donohue & Raymond

[57] ABSTRACT

An adapter for a hand-operated power driven screwdriver and accommodating at least part of the barrel. A drill bit chuck is rotatably mounted in the adapter, and the chuck is driven by the engagement of the tip end of the screwdriver with a screw head mounted in the end of the rotatable chuck on the axis of rotation. The chuck accommodates a cutting tool, such as a drill bit, for drilling guide holes for screws into a surface. The adaptor can be removed from the power driven screwdriver to drive screws into the guide holes.

16 Claims, 1 Drawing Sheet

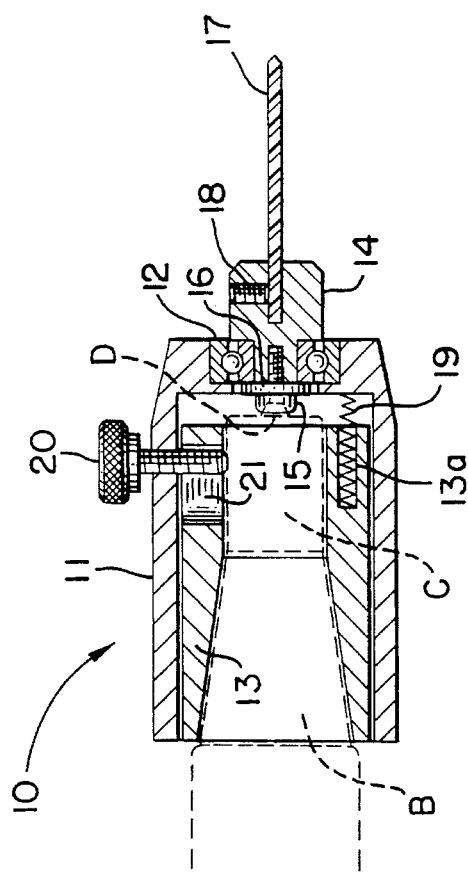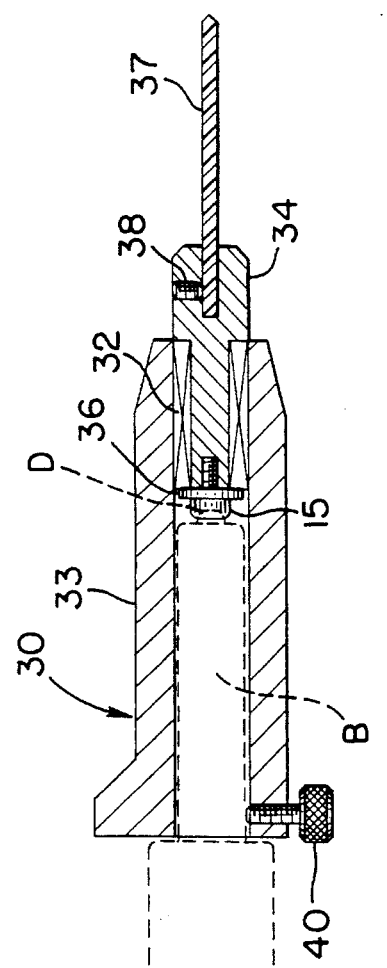

5,564,717

REMOVABLE ADAPTER FOR A POWER-DRIVEN SCREWDRIVER

BACKGROUND OF THE INVENTION

This invention relates to a removable adapter for a hand-operated power driven screwdriver, and more particularly, to an adapter which, when mounted on the barrel of the power tool, accommodates a drill bit chuck for a tool for drilling guide holes for screws in dry wall, plaster board or Sheetrock, and when the adapter is removed, facilitates the drilling of the screws in the guide holes.

Adapters for converting hand-operated power driven screwdrivers into cutting tools, such as drills, have heretofore been proposed, but they are not adapted for use with screwdrivers having barrels with integral noses from which the screwdriver protrudes a limited distance. On the contrary, they are limited for use with screwdrivers having removable nose cones of the type which can be preadjusted to limit the depth that a screw is driven into a surface, but they require removal of the nose cone to accommodate the adapter. Accordingly, the nose cone must be placed on the screwdriver and properly adjusted after removing the adapter in order to obtain the benefit of the depth gauge feature of the nose cone to insure that the screw is not driven through the dry wall, plaster board or Sheetrock.

Adapters of this type are disclosed in U.S. Pat. Nos. 3,973,784, issued Aug. 10, 1976, and 5,110,143, issued May 5, 1992. Both of these adapters embody drilling tools with hexagonal sleeves which receive hexagonal shafts of the screwdriver bit in telescoping relation in order to transmit the drive from the power tool to the drill bit. This telescoping drive transmission requires removal of the nose cone. If advantage is to be taken of the depth gauge feature of the nose cone, the nose cone must be installed and adjusted after removal of the adapter.

SUMMARY OF THE INVENTION

The present invention relates to a novel and improved adapter for a hand-operated power driven screwdriver in which the adapter has a sleeve open at one end for receiving at least part of the barrel of the screwdriver, a drill bit chuck rotatably mounted at the opposite end of the adapter and a screw head mounted in the end of the rotatable chuck on the axis of rotation thereof, the screw head being engageable with the tip end of the screwdriver to drive the chuck. With the adapter in place, guide holes for the screws can be easily and quickly drilled into the dry wall, plaster board, Sheetrock or other material and then the adapter can be easily removed to drill the screws into the guide holes.

The adapter of the present invention can be used in conjunction with power driver screwdrivers of the type in which the screwdriver protrudes from the end of a barrel having an integrally formed nose or from the end of a nose cone which can be preadjusted for controlling the amount of the protrusion of the tip end of the screwdriver beyond the nose cone for limiting the depth to which the screws can be driven into a surface.

The adapter of the present invention can be made to accommodate various shapes of barrel in snug fitting relationship, for example, cone shaped and cylindrical barrels, and it can be locked onto either the barrel or the nose cone by suitable locking means, such as a locking screw.

In one preferred mode, the sleeve can be adjustably accommodated longitudinally in an outer cylinder so that the sleeve can be adjusted to engage the screwdriver in driving relationship with the screw head before locking the screwdriver and sleeve within the outer cylinder. This feature permits the protrusion of the screwdriver from the nose cone to be adjustable over a wide range, thereby providing a wide range of depth limiting control for driving the screws.

DESCRIPTION OF DRAWINGS

These and other features of the present invention will be more fully understood by reference to the detailed description which follows and to the accompanying drawing in which:

FIG. 1 is a cross-sectional view of one embodiment of the adapter as shown mounted on a hand-operated power driven screwdriver with the latter indicated in broken lines; and FIG. 2 is a cross-sectional view of another embodiment of the adapter for mounting on a hand-operated power tool having a cylindrical barrel with an integral nose from which the screwdriver protrudes.

DESCRIPTION OF PREFERRED EMBODIMENTS

The adapter 10 shown in FIG. 1 is for a hand-operated, power driven screwdriver A having a barrel B, an adjustable nose cone C which serves as an adjustable depth limiting control for driving a screw and a screwdriver D. The screwdriver D protrudes beyond the nose cone C by an amount determined by the longitudinal setting of the nose cone so that when the screwdriver is used to drive screws into a surface, for example, the surface of dry wall, plaster board or Sheetrock, the depth of the screw will be limited by the engagement of the end of the nose cone with the flat wall surface.

The adapter converts the hand-operated, power driven screwdriver into a hand-operated power cutting tool, such as a drill, in order to drill guide holes for screws. When the guide holes have been drilled, the adapter can be readily removed from the power driven screwdriver and the screws driven into the guide holes to the depth limited by the nose cone C.

The adapter 10 shown in FIG. 1 includes a cylindrical housing 11 for a bearing 12, a sleeve 13 having an inner contoured surface of complementary shape to the barrel and nose cone of the power tool to be accommodated therein, a chuck 14 mounted for rotation in the bearing 12, a flat headed screw 15 within the housing 11 and threaded into the chuck 14 on its axis of rotation and a washer 16 interposed between the head of the screw 15 and the inner surface of the chuck 14. A drill bit 17, or other cutting tool, can be mounted in the outer end of the chuck 14 by a locking screw 18. The sleeve 13 is longitudinally movable within the housing 11, and the inner end of the sleeve has a plurality of longitudinally extending recesses 13a therein for receiving coil springs 19 interposed between the inner end of the sleeve and the end wall of the housing 11.

When the adapter 10 is placed on the barrel B of the power driven screwdriver, the sleeve 13 accommodates the nose cone C and part of the barrel B in snug-fitting relationship, and the sleeve 13 can be displaced longitudinally relative to the outer housing 11 until the screwdriver D is in driving engagement with the screw head 15. When the driving engagement between the screwdriver and screw head has been established, the adapter can be locked in place by a thumbscrew 20 threaded through the housing 11 to engage the barrel or nose cone. A longitudinally elongated slot 21 in the sleeve is aligned with the threaded opening in the housing to accommodate the locking stem of the thumbscrew irrespective of the longitudinally adjusted position of the sleeve within the housing. The longitudinal displacement of the sleeve 13 within the housing 11 compensates for the amount of the protrusion of the screwdriver beyond the end of the nose cone, so that the nose cone can be preadjusted to serve as a depth gauge for controlling the limit to which a screw can be driven into the dry wall, plaster board or Sheetrock. Thus, the sleeve 13 snugly accommodates both the nose and a portion of the barrel, so that the screwdriver and screw head can be engaged in driving relationship and the thumbscrew 20 tightened to lock the adapter on the tool irrespective of the amount of protrusion of the screwdriver beyond the end of the nose.

The screw head 15 is preferably of the type which accommodates a Phillips head screwdriver, but it can also be formed with at least one cross slot to accommodate both a conventional and a Phillips head screwdriver. The housing 11 is preferably made of a relatively rigid material, such as glass reinforced Lexan or nylon. The sleeve can be made of the same or other materials.

An alternative adapter for a hand-operated power driven screwdriver having a cylindrical barrel with integral nose is shown in FIG. 2. Power driven screwdrivers of this type have rotatable magnetic barrels to permit a screw to be engaged with the screwdriver and magnetically held by the barrel before driving the screw into a surface. In this embodiment the sleeve 33 is shaped to accommodate the cylindrical barrel B of a power driven screwdriver A to bring the end of the screwdriver in driving engagement with the screw head 15. In this embodiment, the sleeve 33 itself accommodates a bearing 32 for a rotatable chuck 34. A cutting tool or drill bit 37 is locked in the chuck by a locking screw 38. A washer 36 is interposed between the screw head 15 and the inner end of the chuck. A thumbscrew 40 is threaded through the sleeve to engage the barrel of the gun and lock the adapter thereon for rotation with the barrel. The sleeve 33 is preferably made of a relatively rigid material, such as glass reinforced Lexan or nylon.

The present invention has been shown in preferred forms and by way of example, and many variations and modifications can be made therein within the spirit of the invention. The invention, therefore, is not intended to be limited to any specified form or embodiment, except insofar as such limitations are expressly set forth in the claims.

I claim:

1. An adapter for a hand-operated power driven screwdriver having a barrel, the adapter comprising a sleeve open at one end to receive at least part of the barrel, a drill bit chuck rotatably mounted at an opposite end of the adapter, and a screw head in the rotatable chuck on the axis of rotation thereof, the screw head being engageable with the tip end of the power driven screwdriver to drive the chuck, the screwdriver tip and the screw head being the driving connection between the screwdriver and the drill bit chuck.

2. An adapter as set forth in claim 1 including means for locking the adapter on the barrel of the power driven screwdriver while the screwdriver is used to drill screw accommodating guide holes and for unlocking the adapter to remove it from the barrel to drill screws into the guide holes.

3. An adapter as set forth in claim 1 including bearings arranged in the said opposite end of the adapter for accommodating the chuck for rotation.

4. An adapter for a hand-operated power driven screwdriver having a barrel, the adapter comprising a sleeve open at one end to receive at least part of the barrel, a drill bit chuck rotatably mounted on the opposite end of the adapter and a screw head mounted in the end of the rotatable chuck on the axis of rotation thereof, the screw head being engageable with the tip end of the power driven screwdriver to drive the chuck and in which the screw head is part of a screw threaded into the chuck on its axis of rotation.

5. An adapter for a hand-operated power driven screwdriver having a barrel and a depth limiting nose, the protrusion of the screwdriver from the nose controlling the limit that a screw can be driven into a surface, the adapter comprising a sleeve open at one end to receive at least part of the barrel, the nose and the portion of the screwdriver protruding from the nose, a drill bit chuck rotatably mounted at the opposite end of the adapter, and a screw head mounted in an end of the rotatable chuck on the axis of rotation, the screw head being engageable with a tip end of the power driven screwdriver to drive the chuck.

6. An adapter as set forth in claim 5, in which the chuck is rotatably mounted in an end of the sleeve.

7. An adapter as set forth in claim 6, including means on the sleeve for locking the adapter on the barrel of the screwdriver.

8. An adapter as set forth in claim 5, in which the sleeve has an inner surface to accommodate at least part of the barrel and the nose in snug fitting relationship.

9. An adapter as set forth in claim 5, including means for locking the adapter on the screwdriver and for unlocking the adapter for removal from the screwdriver.

10. An adapter as set forth in claim 9, including an outer housing in which the sleeve is longitudinally adjustable and in which said locking means is carried by the outer housing.

11. An adapter as set forth in claim 10, including a spring means interposed between the sleeve and the outer housing to urge the sleeve toward the barrel.

12. An adapter for a hand-operated power driven screwdriver having a barrel and a depth limiting nose, the protrusion of the screwdriver from the nose controlling the limit that a screw can be driven into a surface, the adapter comprising a sleeve open at one end to receive at least part of the barrel, the nose and the portion of the screwdriver protruding from the nose, a drill bit chuck rotatably mounted at the opposite end of the adapter, a screw head in an end of the rotatable chuck on the axis of rotation, the screw head being engageable with the tip end of the power driven screwdriver to drive the chuck, an outer housing in which the sleeve is longitudinally adjustable relative to the outer housing to accommodate a screwdriver in which the protrusion of the screwdriver from the nose is adjustable and in which the adjustment of the sleeve relative to the outer housing permits the tip end of the screwdriver to engage the screw head in driving relationship irrespective of the adjusted protrusion of the tip end beyond the nose.

13. An adapter as set forth in claim 12, in which the chuck is rotatably mounted in the outer housing.

14. An adapter as set forth in claim 12, including means on the outer housing for locking the adapter relative to the nose and a longitudinally extending slot in the sleeve to accommodate the locking means.

15. An adapter as set forth in claim 12, including a spring urging the sleeve relative to the outer housing in a direction to disengage the screwdriver from the screw head.

16. An adapter as set forth in claim 14, in which the locking means is a locking screw threaded through the outer housing and extending through the longitudinally extending slot to engage the nose.

\* \* \* \* \*